United States Patent
Uno

(10) Patent No.: US 12,372,851 B2
(45) Date of Patent: Jul. 29, 2025

(54) APERTURE DEVICE, CAMERA MODULE WITH APERTURE DEVICE, AND ELECTRONIC APPARATUS

(71) Applicant: BEIJING XIAOMI MOBILE SOFTWARE CO., LTD., Beijing (CN)

(72) Inventor: Masaru Uno, Tokyo (JP)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/908,873

(22) PCT Filed: Apr. 14, 2021

(86) PCT No.: PCT/CN2021/087304
§ 371 (c)(1),
(2) Date: Sep. 1, 2022

(87) PCT Pub. No.: WO2022/217514
PCT Pub. Date: Oct. 20, 2022

(65) Prior Publication Data
US 2023/0384650 A1   Nov. 30, 2023
US 2025/0110385 A2   Apr. 3, 2025

(51) Int. Cl.
*G03B 7/00* (2021.01)
*G02B 5/00* (2006.01)
*G03B 9/04* (2021.01)

(52) U.S. Cl.
CPC ............ *G03B 7/006* (2013.01); *G02B 5/005* (2013.01); *G03B 9/04* (2013.01)

(58) Field of Classification Search
CPC . H02N 2/103; G03B 9/02; G03B 9/06; G02B 5/005
See application file for complete search history.

(56) References Cited

U.S. PATENT DOCUMENTS

| 2,684,611 A | * | 7/1954 | Hinden | .................. G03B 11/00 359/611 |
| 6,664,710 B1 | * | 12/2003 | Gottlieb | ................. H02N 2/105 310/323.02 |

(Continued)

FOREIGN PATENT DOCUMENTS

| CN | 102067033 A | 5/2011 |
| CN | 102402101 A | 4/2012 |

(Continued)

OTHER PUBLICATIONS

Extended European Search Report of EP Application No. 21927049.3 dated Jun. 27, 2023, (7p).

(Continued)

*Primary Examiner* — Noam Reisner
(74) *Attorney, Agent, or Firm* — Arch & Lake LLP; Hao Tan; Shen Wang

(57) ABSTRACT

An aperture device for setting an amount of light incident on a lens of a camera module is provided. The aperture device includes: a diaphragm plate exhibiting a plate shape and formed with an aperture opening penetrating the diaphragm plate in a plate surface direction; and a configuration-changing mechanism for changing a configuration of the diaphragm plate to an aperture position or a retracted position, where the aperture position is a position where the diaphragm plate is on the lens and a center of the aperture opening is configured in a position corresponding to an optical axis of the lens, and the retracted position is a position where the diaphragm plate is retracted from the lens.

12 Claims, 11 Drawing Sheets

(56) References Cited

U.S. PATENT DOCUMENTS

| | | | |
|---|---|---|---|
| 2004/0227433 A1* | 11/2004 | Miyazawa | G02B 26/04 310/328 |
| 2009/0296185 A1 | 12/2009 | Okita | |
| 2011/0085223 A1* | 4/2011 | Ide | G03B 17/12 359/896 |
| 2011/0091198 A1 | 4/2011 | Tasegawa | |
| 2012/0024126 A1 | 2/2012 | Numnual et al. | |
| 2012/0057859 A1 | 3/2012 | Byon et al. | |
| 2014/0111843 A1 | 4/2014 | Kozu et al. | |
| 2018/0136437 A1 | 5/2018 | Ono | |
| 2020/0379148 A1* | 12/2020 | Hanaoka | G02B 5/005 |
| 2024/0088748 A1* | 3/2024 | Bian | H04N 23/55 |

FOREIGN PATENT DOCUMENTS

| | | | |
|---|---|---|---|
| CN | 108139559 A | 6/2018 | |
| CN | 111399160 A | 7/2020 | |
| IN | 103649829 A | 3/2014 | |
| JP | H0915675 A | 1/1997 | |
| JP | 2001174862 A | 6/2001 | |
| JP | 2006330314 A | 12/2006 | |
| JP | 2010002611 A | 1/2010 | |
| WO | 2005066708 A1 | 7/2005 | |
| WO | 2019124071 A1 | 6/2019 | |

OTHER PUBLICATIONS

First Office Action issued to Japanese Application No. 2021-531251 dated Jun. 23, 2023 with English translation, (7p).

* cited by examiner

APERTURE DEVICE, CAMERA MODULE WITH APERTURE DEVICE, AND ELECTRONIC APPARATUS

CROSS-REFERENCE TO RELATED APPLICATION

This application is the U.S. national phase application of International Application No. PCT/CN2021/087304, filed on Apr. 14, 2021, the entire contents of which are incorporated herein by reference for all purposes.

BACKGROUND

At present, camera modules assembled in electronic apparatuses (e.g., smartphones, tablet computers and etc.) are equipped with aperture devices, and the aperture devices adjust the amount of light incident on lenses (which allow light reaching camera elements to pass through) according to specified aperture values.

Such an aperture device is known for example from JP2007156283, in which the device has two aperture blades and an actuator, the two aperture blades are slidable relative to each other in an overlapping state, and the actuator transmits power to one of the aperture blades.

The two aperture blades are each formed with a recess. In addition, the two aperture blades overlap and form an aperture opening (for the passage of light reaching lenses) by their recesses.

The actuator is configured to transmit power to one aperture blade on one side, and when the aperture blade on one side moves, another aperture blade on the other side also moves in association with the one aperture blade on one side.

In this aperture device, the amount of light incident on the lenses can be increased when the two aperture blades are slid relative to each other to enlarge a size of the aperture opening, and the amount of light incident on the lenses can be decreased when the two aperture blades are slid relative to each other to reduce the size of the aperture opening.

SUMMARY

The present disclosure relates to an aperture device carried by a camera module and used to change the amount of light incident on lenses, a camera module with such an aperture device, and an electronic apparatus.

According to a first aspect of the present disclosure, an aperture device is provided to set an amount of light incident on a lens of a camera module and includes: a diaphragm plate including a shielding region for shielding the light incident on the lens; and a configuration-changing mechanism for changing a configuration of the diaphragm plate to an aperture position or a retracted position, where the aperture position may be a position where the diaphragm plate is on the lens and a center of an aperture opening is in a position corresponding to an optical axis of the lens, and the retracted position may be a position where the diaphragm plate is retracted from the lens.

According to a second aspect of the present disclosure, a camera module is provided. The camera module includes a lens unit having a lens, a housing accommodating the lens, and a power-receiving portion mounted on the housing and receiving electric power supply from outside; and an aperture device for setting the amount of light incident on the lens. The aperture device includes: a diaphragm plate including a shielding region for shielding the light incident on the lens; and a configuration-changing mechanism for changing a configuration of the diaphragm plate to an aperture position or a retracted position, where the aperture position may be a position where the diaphragm plate is on the lens and a center of an aperture opening is in a position corresponding to an optical axis of the lens, and the retracted position may be a position where the diaphragm plate is retracted from the lens.

According to a third aspect of the present disclosure, an electronic apparatus is provided. The electronic apparatus includes a lens and an aperture device for setting the amount of light incident on the lens. The aperture device includes: a diaphragm plate including a shielding region for shielding the light incident on the lens; and a configuration-changing mechanism for changing a configuration of the diaphragm plate to an aperture position or a retracted position, where the aperture position may be a position where the diaphragm plate is on the lens and a center of an aperture opening is in a position corresponding to an optical axis of the lens, and the retracted position may be a position where the diaphragm plate is retracted from the lens.

DETAILED DESCRIPTION OF EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the disclosure are only adopted for the purpose of describing specific embodiments and not intended to limit the disclosure. "A/an," "said" and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

It is to be understood that, although terms first, second, third and the like may be adopted to describe various information in the disclosure, the information should not be limited to these terms. These terms are only adopted to distinguish the information of the same type. For example, without departing from the scope of the disclosure, first information may also be called second information and, and similarly, second information may also be called first information. For example, the term "if" used here may be explained as "while" or "when" or "responsive to determining," which depends on the context.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

In the existing aperture devices described above, errors sometimes occur in positions of the two blades even when a width of the aperture opening is set according to a specified aperture value. In this case, the width of the aperture opening mismatches the specified aperture value, and the amount of light incident on the lenses may be sometimes set inappropriately.

In view of the practical situations, the objective of the present disclosure is to provide an aperture device capable of appropriately setting the amount of light incident to lenses, a camera module including the aperture device, and an electronic device.

An aperture device according to an embodiment of the present disclosure will be described below with reference to the accompanying drawings.

Figure 1:
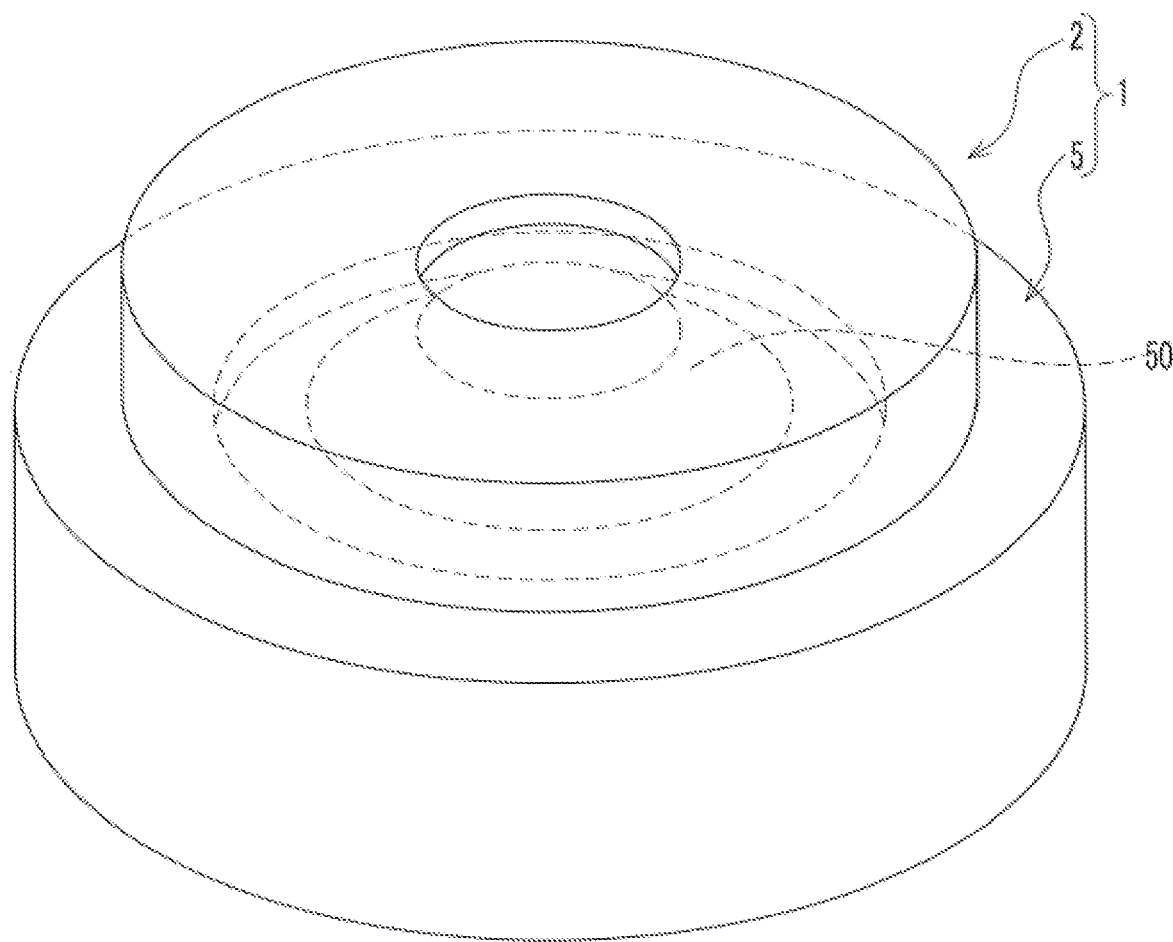
FIG. 1 is a schematic diagram showing an appearance of an aperture device in accordance with an embodiment of the present disclosure.

As shown in FIG. 1, the aperture device is carried on a camera module 1 assembled in an electronic apparatus (e.g., a smartphone, a tablet computer and etc.).

The aperture device 2 is mounted on a lens unit 5 including a lens 50, and the lens 50 allows light reaching a camera element to pass through. In such a way, the amount of light incident on the lens 50 (incident light) can be changed according to a set aperture value.

The structure of the lens unit 5 is described before the structure of the aperture device 2 is described.

Figure 2:
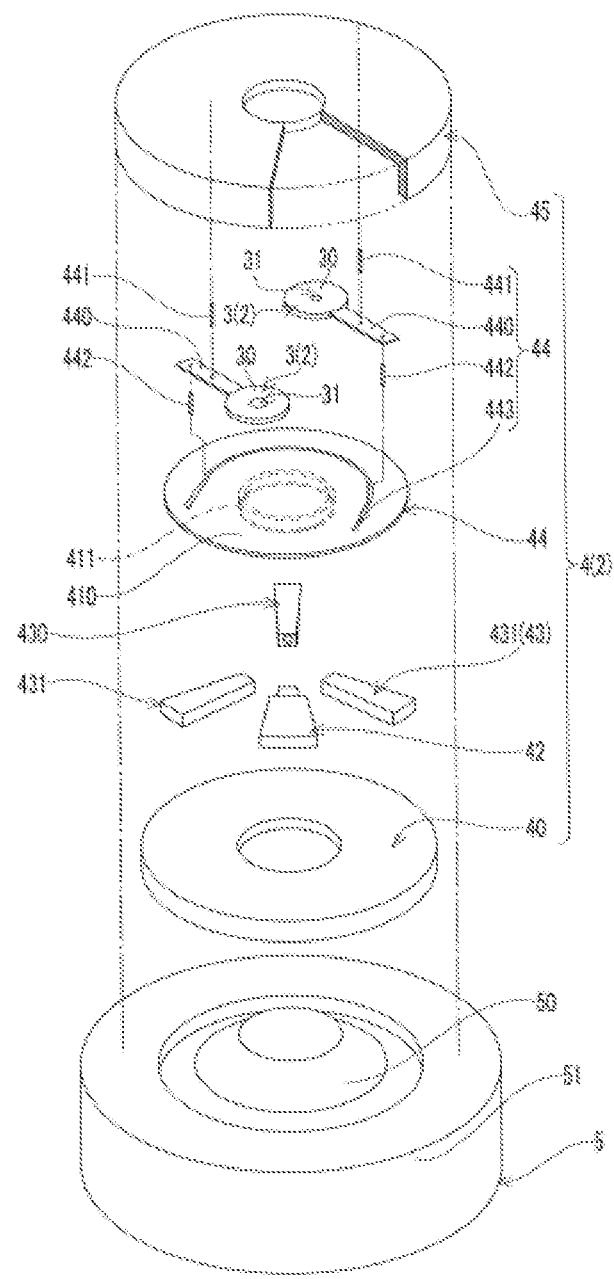
FIG. 2 is a schematic diagram showing the aperture device of the same embodiment in an exploded state.
Figure 5:
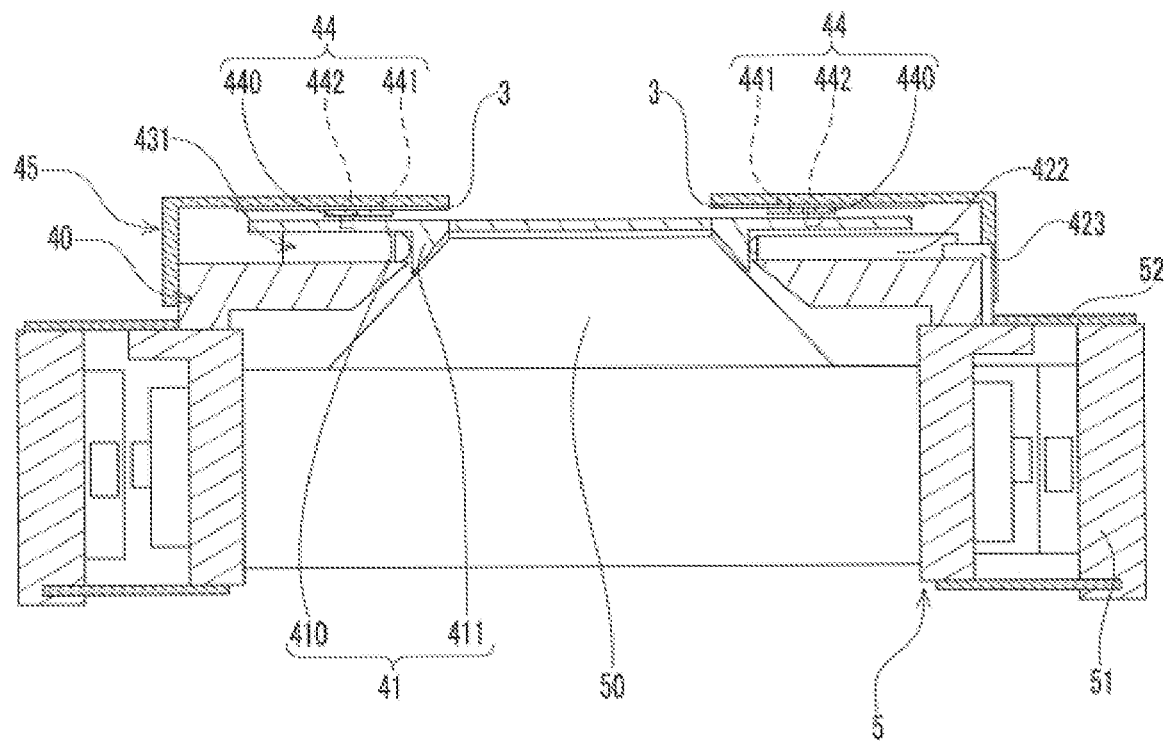
FIG. 5 is a sectional view in a position corresponding to line V-V of FIG. 4.

As shown in FIGS. 2 and 5, the lens unit 5 includes: the lens 50; a housing 51 for accommodating the lens 50; and a power-receiving portion 52 mounted on the housing 51 and configured to receive electric power supply from the outside (see FIG. 5).

For example, a focus control portion for adjusting a focus of the lens 50 is mounted in the housing 51, and electric power can be supplied to the focus control portion through the power-receiving portion 52.

In this embodiment, in the following description, an extension direction of an optical axis of the lens 50 is referred to as an optical axis direction; a circumferential direction with the optical axis of the lens 50 as a center is referred to as an optical axis circumferential direction; and a direction orthogonal to the optical axis direction and the optical axis circumferential direction is referred to as an optical axis radial direction.

As shown in FIG. 2, the aperture device 2 in this embodiment includes: a diaphragm plate 3 that changes the amount of light incident on the lens 50; and a configuration-changing mechanism 4 that changes a configuration of the diaphragm plate 3 to an aperture position or a retracted position, the aperture position being a position where the diaphragm plate is on the lens 50 and a center of an aperture opening is in line with the optical axis of the lens 50, and the retracted position being a position where the diaphragm plate is retracted from the lens 50.

Figure 3:
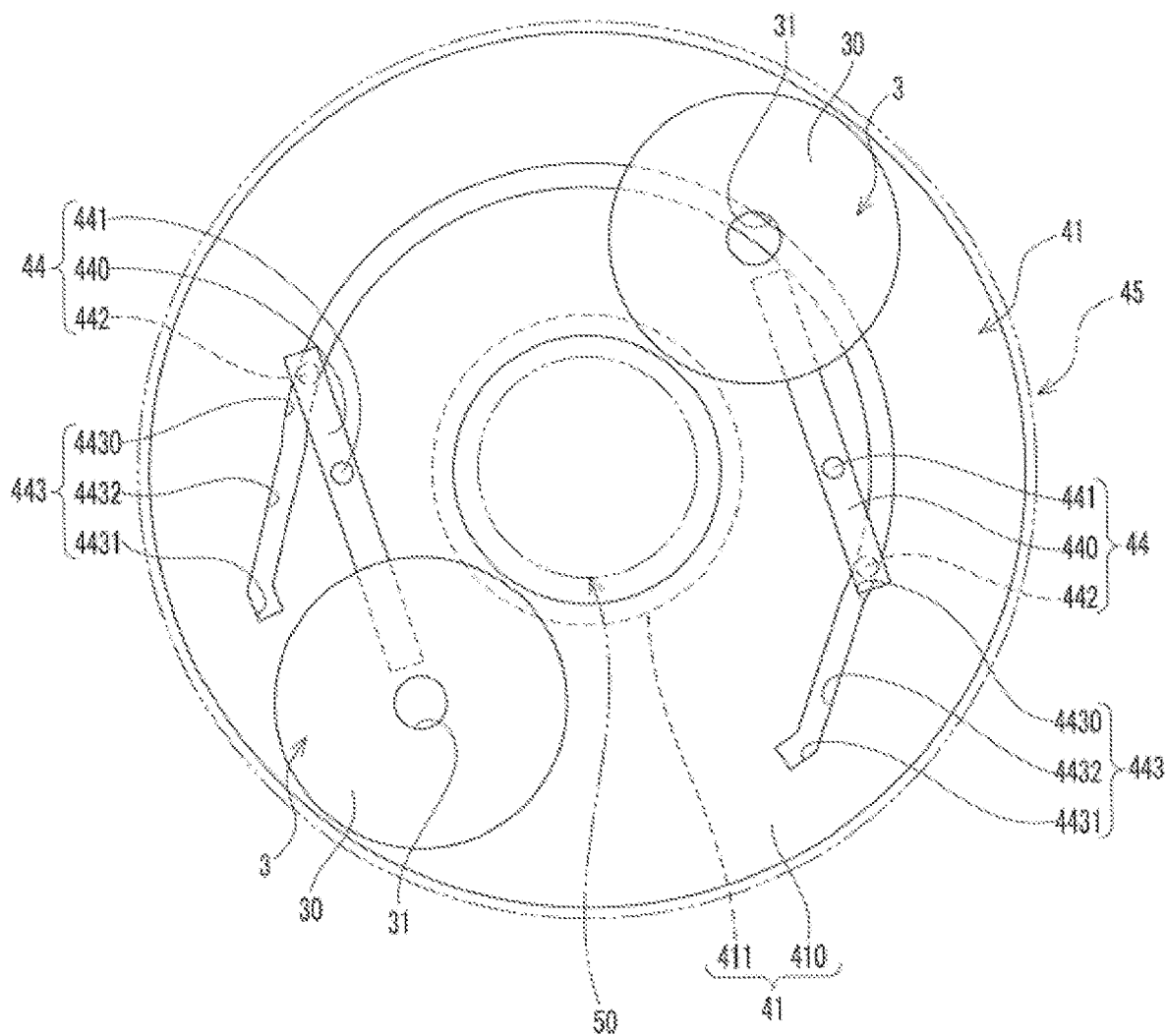
FIG. 3 is a top view showing the aperture device of the same embodiment in a state with a cover removed.

Furthermore, the aperture position of the diaphragm plate 3 is, in a top view, a position where a center of the diaphragm plate 3 (the center of the aperture opening) coincides with a center of the optical axis of the lens 50 (see FIG. 3). The retracted position of the diaphragm plate 3 is, in the top view, a position where the diaphragm plate 3 as a whole is in a state closer to an outer side of the optical axis radial direction than the lens 50 (see FIGS. 9B and 10B).

As shown in FIG. 3, the diaphragm plate 3 is formed as a flat plate. The diaphragm plate 3 is a round plate in this embodiment. Additionally, the diaphragm plate 3 includes a shielding region 30, and the shielding region 30 shields the light incident on the lens 50 when it is on the lens 50.

Since the diaphragm plate 3 in this embodiment is formed with the aperture opening 31 in its central part, through which the light incident on the lens 50 passes, the shielding region 30 is shaped as a circular ring.

The aperture device 2 in this embodiment includes two diaphragm plates 3. A diameter of an aperture opening 31 formed in one diaphragm plate 3 on one side is different from a diameter of an aperture opening 31 formed in the other diaphragm plate 3 on the other side. That is, the two diaphragm plates 3 are formed according to different aperture values.

As shown in FIG. 2, the configuration-changing mechanism 4 includes: a base 40 fixed to the lens unit 5 (the housing 51); a rotor 41 configured on the base 40 and rotatable in the optical axis circumferential direction; a driving source 42 used to rotate the rotor 41 in the optical axis circumferential direction; a holding structure 43 used to fix a configuration position of the rotor 41 in a predetermined position (a position where a center of the rotor 41 itself coincides with a center of the lens 50); a moving mechanism 44 that is linked to the rotation of the rotor 41 to move the diaphragm plate 3 towards the aperture position or the retracted position; and a cover 45 covering the base 40, the rotor 41, the driving source 42, the holding structure 43 and the moving mechanism 44.

The base 40 is shaped as a circular ring. The base 40 is fixed to the housing 51 when it is carried on the housing 51. Furthermore, a front end portion of the lens 50 is inserted in and passes through a central part of the base 40.

The rotor 41 is shaped as a circular ring. A central axis of the rotor 41 is at a position corresponding to the optical axis. Thus, a center of rotation of the rotor 41 is at a position corresponding to the optical axis.

In addition, the rotor 41 in this embodiment has an annular plate portion 410 and a cylindrical portion 411, and the cylindrical portion 411 protrudes downwards from a lower surface of a central part of the annular plate portion 410.

A plate surface of one side of the annular plate portion 410 is configured to face upwards in the optical axis direction (an orientation corresponding to an upper part of FIG. 2) and a plate surface of the other side of the annular plate portion 410 is configured to face downwards in the optical axis direction (an orientation corresponding to a lower part of FIG. 2).

The front end portion of the lens 50 is inserted in and passes through the cylindrical portion 411. In addition, the cylindrical portion 411 is formed to bear the driving source 42 and the holding structure 43 by using an outer circumferential surface.

Figure 4:
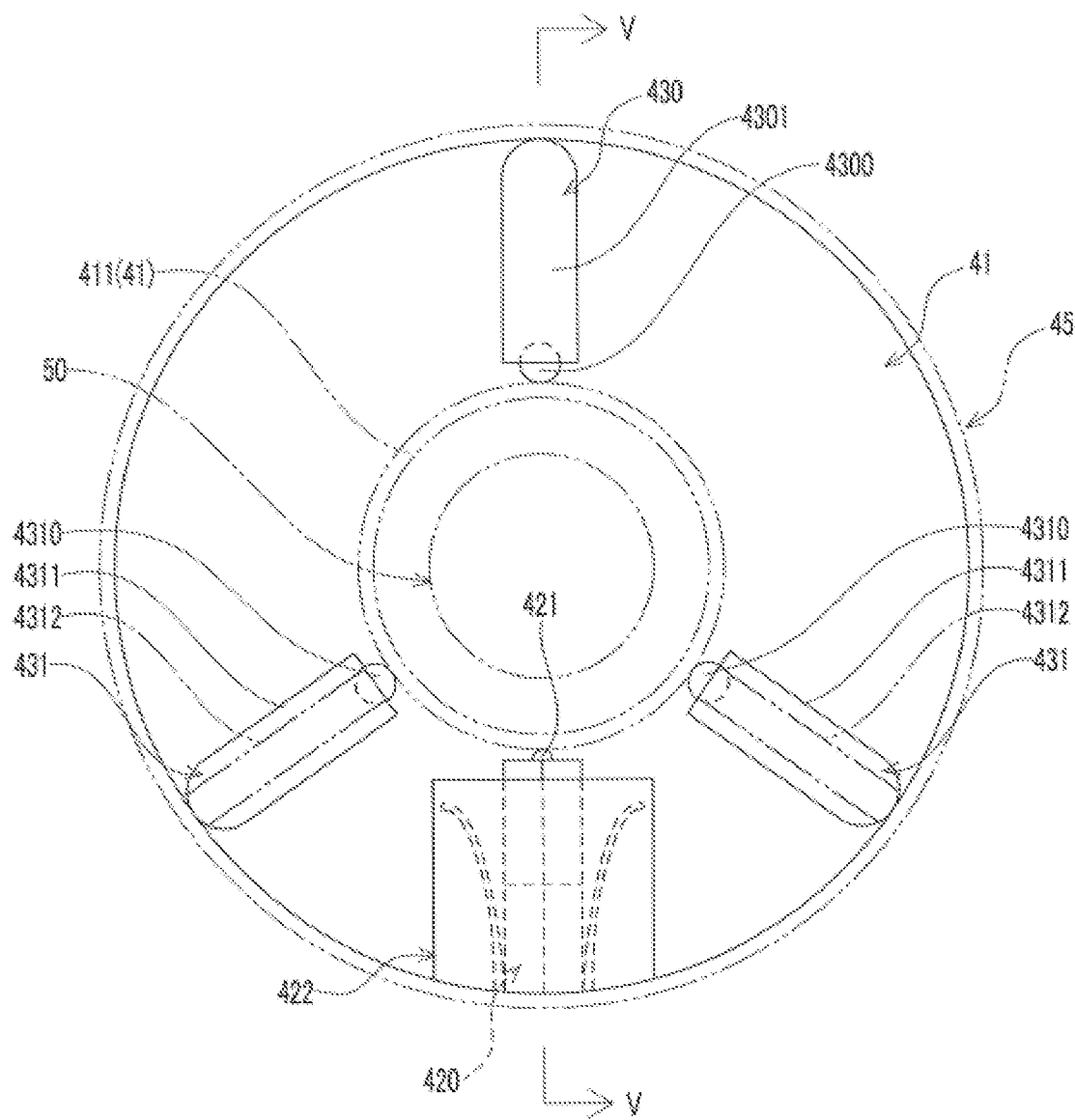
FIG. 4 is a top view showing the aperture device of the same embodiment in a state with a rotor and a structure on the rotor removed.

As shown in FIG. 4, the driving source 42 includes: a piezoelectric element 420 that is on a lower side of the annular plate portion 410 and is configured from an outer side towards an inner side (towards the cylindrical portion 411) in the optical axis radial direction; an abutting portion 421 mounted on a front end of the piezoelectric element 420 and abutting the rotor 41; a mounting portion 422 that mounts the piezoelectric element 420 to the base 40; and a power supply portion 423 (see FIG. 5) supplying electric power transmitted to the piezoelectric element 420.

Figure 6:
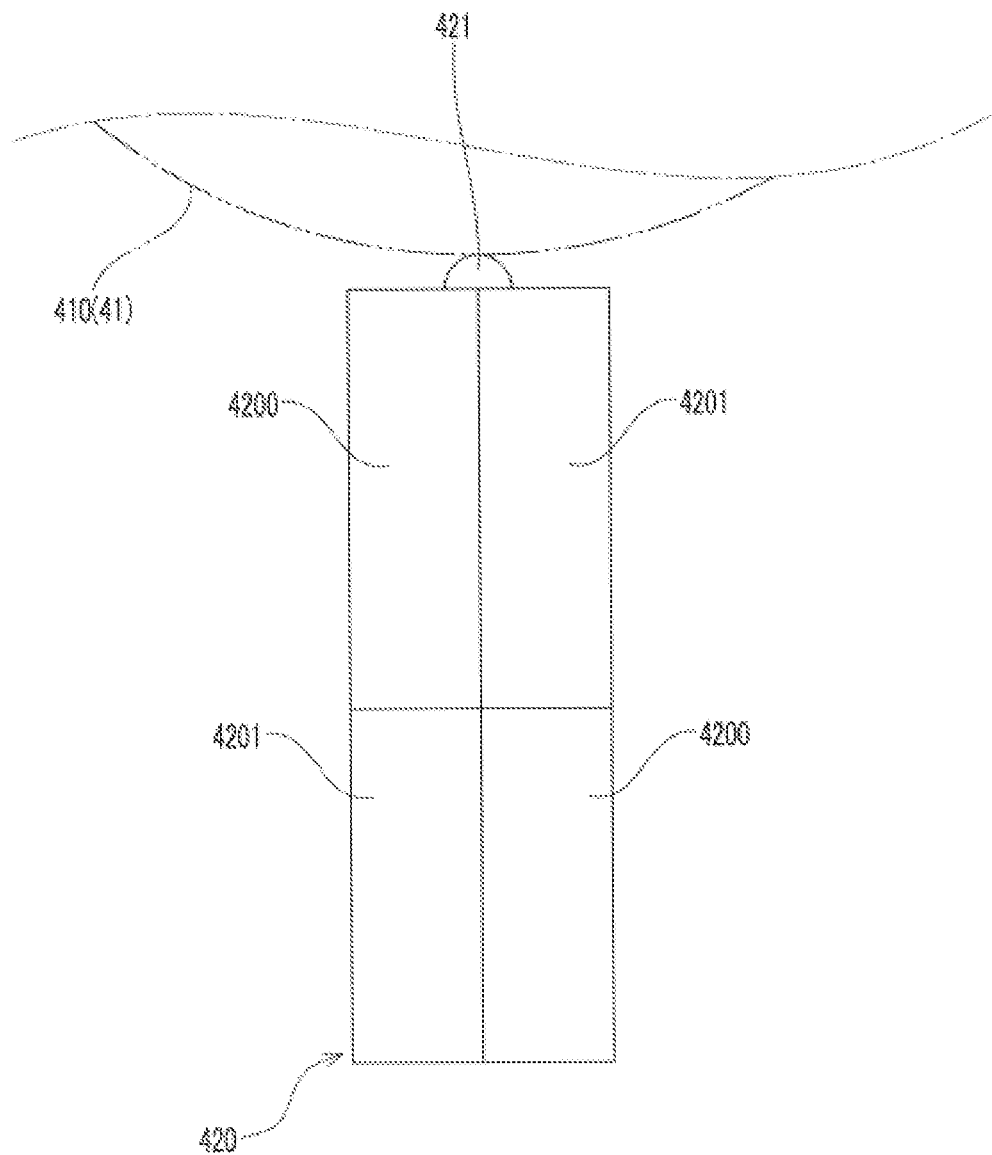
FIG. 6 is a top view showing a piezoelectric element of the aperture device of the same embodiment.

As shown in FIG. 6, the piezoelectric element 420 includes four regions arranged in two rows and two columns, in which one pair of opposite regions 4200 are homogeneous regions and another pair of opposite regions 4201 are homogeneous regions.

Electric power (pulses) is applied to the pair of opposite regions (hereinafter referred to as first regions) 4200 and the other pair of opposite regions (hereinafter referred to as second regions) 4201 at different points in time.

Figure 7A:
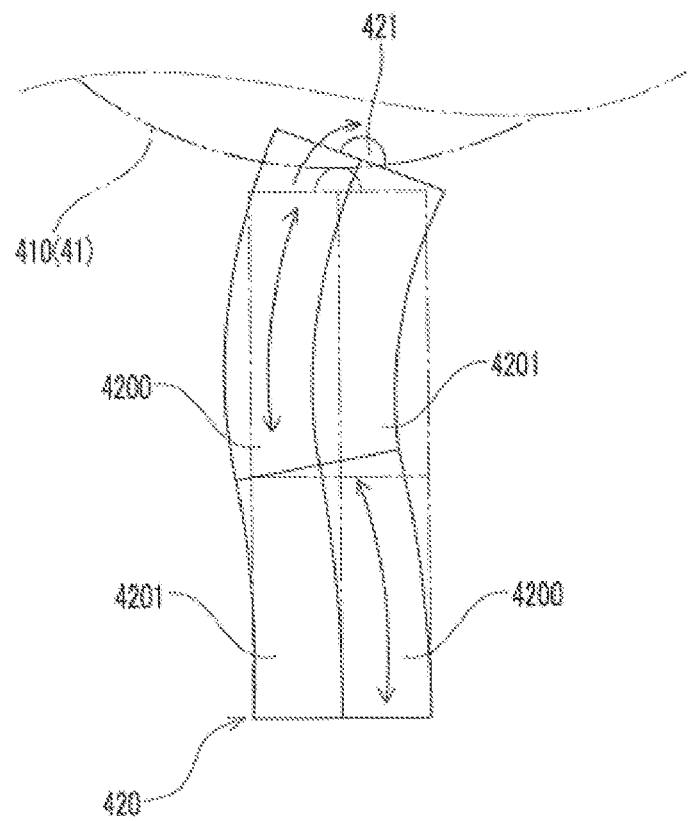
FIG. 7A is a schematic diagram showing the piezoelectric element of the aperture device of the same embodiment in a state of applying electric power to a first region.

When pulses are applied to the first regions 4200, as shown in FIG. 7A, a front end portion of the piezoelectric element 420 enters in a trajectory (an arc-shaped trajectory) bent to the front and to a first side of the width direction, since each first region 4200 is elongated while each second region 4201 maintains its original shape.

Figure 7B:
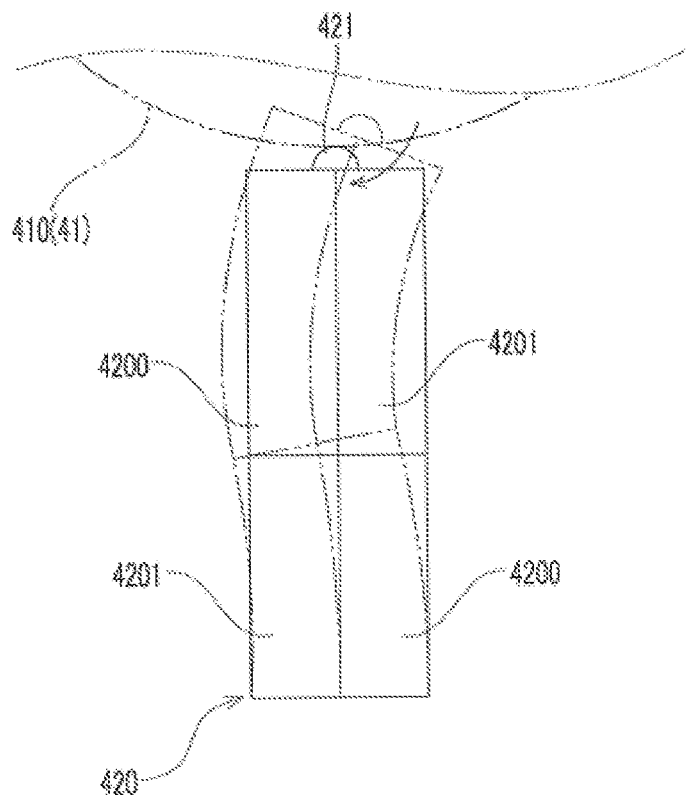
FIG. 7B is a schematic diagram showing the piezoelectric element of the aperture device of the same embodiment in a state of stopping the application of the electric power to the first region.

Furthermore, when the application of the pulses to the first regions 4200 is stopped, as shown in FIG. 7B, the front end portion of the piezoelectric element 420 returns to its original position in a trajectory (an arc-shaped trajectory) bent to the rear and to a second side of the width direction.

Thus, when repeated pulses are applied to each of the first regions 4200, the abutting portion 421 mounted at the front end portion of the piezoelectric element 420 moves along an elliptical trajectory.

Figure 8A:
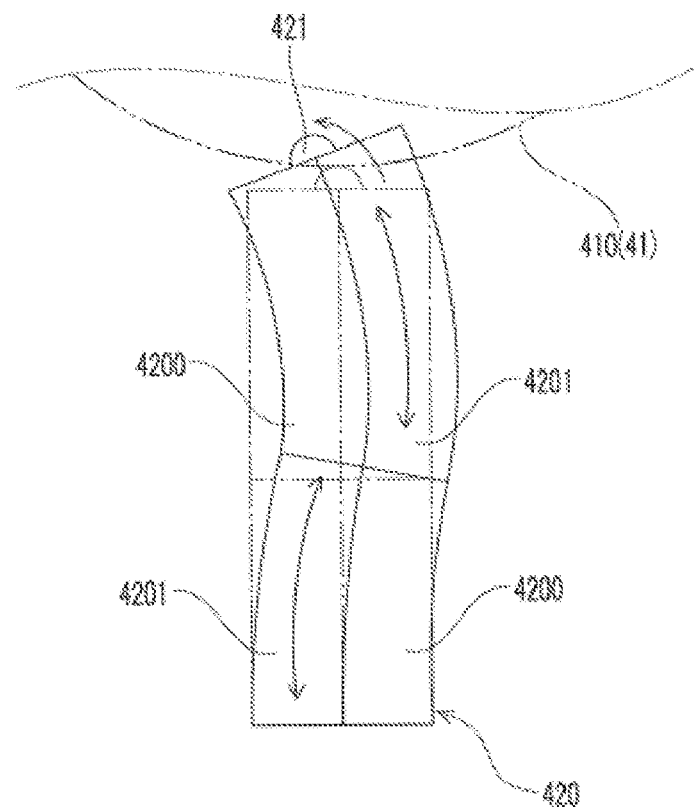
FIG. 8A is a schematic diagram showing the piezoelectric element of the aperture device of the same embodiment in a state of applying electric power to a second region.

In addition, when pulses are applied to the second regions 4201, as shown in FIG. 8A, the front end portion of the piezoelectric element 420 enters in a trajectory (an arc-shaped trajectory) bent to the front and to the second side of the width direction, since each second region 4201 is elongated while each first region 4200 maintains its original shape.

Figure 8B:
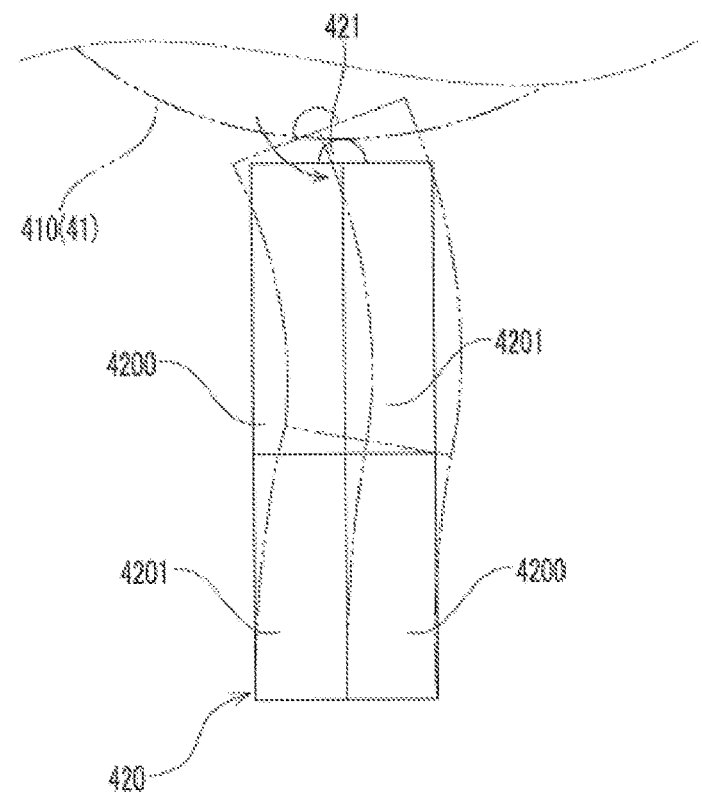
FIG. 8B is a schematic diagram showing the piezoelectric element of the aperture device of the same embodiment in a state of stopping the application of the electric power to the second region.

Furthermore, when the application of the pulses to the second regions 4201 is stopped, as shown in FIG. 8B, the front end portion of the piezoelectric element 420 returns to its original position in a trajectory (an arc-shaped trajectory) bent to the rear and to the first side of the width direction.

As a result, when repeated pulses are applied to each of the second regions 4201, the abutting portion 421 mounted at the front end portion of the piezoelectric element 420 also moves along an elliptical trajectory.

As shown in FIG. 4, the mounting portion 422 is configured to apply a force to the piezoelectric element 420 towards an inner side of the optical axis radial direction, to maintain an abutment state of the abutting portion 421 and the rotor 41.

The power supply portion 423 in this embodiment is coupled to the power-receiving portion 52 (see FIG. 5). Thus, the electric power applied to the piezoelectric element 420 is supplied via the power-receiving portion 52 of the lens unit 5.

The holding structure 43 includes: opposite holding portions 430 in positions parallel to the driving source 42 (the piezoelectric element 420) in the optical axis radial direction; and lateral holding portions 431 in positions offset from the driving source 42 (the piezoelectric element 420) in the optical axis circumferential direction.

Each of the opposite holding portions 430 includes: a first ball 4300 abutting the rotor 41 from the outer side of the optical axis radial direction; and a bearing portion 4301 bearing the first ball 4300 on the outer side of the optical axis radial direction.

Each of the lateral holding portions 431 includes: a second ball 4310 abutting the rotor 41 from the outer side of the optical axis radial direction; a tubular cylinder 4311 on an outer side of the second ball 4310 in the optical axis radial direction; and a force-applying unit 4312 for abutment, which is within the cylinder 4311 and applies force to the first and second balls 4300, 4310 and thus to the rotor 41.

Thus, the rotor 41 is allowed to move in the optical axis radial direction within a range in which the ball 4310 of the lateral holding portion 431 moves in the optical axis radial direction, and the rotor 41 returns to its original position using the force of the force-applying unit 4312 after moving in the optical axis radial direction.

As shown in FIG. 2, the moving mechanism 44 includes: a rod portion 440 extending outwards from an outer peripheral edge of the diaphragm plate 3; a connection shaft 441 shaped as a shaft parallel to the optical axis direction, configured in a fixed position, and rotatably coupled to the rod portion 440; an operation portion 442 mounted closer to a front end than a coupling position of the connection shaft 441 in the rod portion 440; and a guide portion 443 causing the operation portion 442 to move towards one side or another side of the optical axis radial direction orthogonal to the optical axis circumferential direction and the optical axis direction according to a rotation action of the rotor 41 in the optical axis circumferential direction.

The rod portion 440 in this embodiment exhibits an elongated sheet shape, and an end of the rod portion 440 in its length direction is fixed to the diaphragm plate 3.

The connection shaft 441 is formed in such a way that its configuration position does not change even if the rotor 41 rotates. In this embodiment, the connection shaft 441 is fixed to the cover 45 and extends downwards from a lower surface of the cover 45.

In addition, the connection shaft 441 is coupled to a rotatable intermediate part between a first end and a second end of the rod portion 440 in its length direction. Thus, the rod portion 440 can rotate in a circumferential direction with the coupling position of the connection shaft 441 as a center (with the connection shaft 441 as a center).

The operation portion 442 is formed to extend from the rod portion 440 towards the rotor 41. In addition, the operation portion 442 of this embodiment is formed in a shaft shape.

The guide portion 443 includes a guide groove, and the guide groove is formed with an opening on an upper surface relative to the rotor 41. The guide portion 443 will be referred to as the guide groove and described below.

As shown in FIG. 3, the guide groove 443 includes: an inner guide 4430 formed on a side of a central part of the rotor 41 (the inner side of the optical axis radial direction); an outer guide 4431 formed on a side closer to an outer peripheral edge of the rotor 41 (the outer side of the optical axis radial direction) than the inner guide 4430; and an intermediate guide 4432 that is continuous with the inner guide 4430 and the outer guide 4431.

The inner guide 4430 and the outer guide 4431 form an arc shape along the optical axis circumferential direction.

In addition, a position of the inner guide 4430 does not overlap with a position of the outer guide 4431 in the optical axis circumferential direction. That is, the inner guide 4430 and the outer guide 4431 are at a distance from each other both in the optical axis radial direction and in the optical axis circumferential direction, and the inner guide 4430 and the outer guide 4431 are coupled by the intermediate guide 4432.

The operation portion 442 is inserted in the guide groove 443, and the rotor 41 is rotatable relative to the operation portion 442. Thus, when a position of the guide groove 443 relative to the operation portion 442 changes during rotation of the rotor 41, the operation portion 442 is pushed in the guide groove 443 by the rotor 41 and thus moves in a direction away from the center of the rotor 41 or in a direction close to the center of the rotor 41.

That is, in this embodiment, the operation portion 442 is a snap portion on the rod portion 440, and the guide groove 443 is a snapped portion on the rotor 41 and is snapped with the operation portion 442. By the snap between the operation portion 442 and the guide groove 443, the rod portion 440 is linked to the rotation of the rotor 41 and rotates with the connection shaft 441 as the center.

Specifically, when the rotor 41 is rotated in a state having the inner guide 4430 in a position corresponding to the operation portion 442, the intermediate guide 4432 passes through the position corresponding to the operation portion 442 and the outer guide 4431 reaches the position corresponding to the operation portion 442.

In such a case, the operation portion 442 is guided by the intermediate guide 4432 in a direction from the center of the rotor 41 to the outer peripheral edge of the rotor 41 (in the direction away from the center of the rotor 41); the second end of the rod portion 440 moves together with the operation portion 442 in the direction from the center of the rotor 41 to the outer peripheral edge of the rotor 41 (in the direction away from the center of the rotor 41); and the diaphragm plate 3 moves together with the first end of the rod portion 440 in a direction from the outer peripheral edge of the rotor 41 to the center of the rotor 41 (in the direction close to the center of the rotor 41). Moreover, the diaphragm plate 3 is changed from the retracted position to the aperture position.

When the rotor 41 is rotated in a state having the outer guide 4431 in the position corresponding to the operation portion 442, the intermediate guide 4432 passes through the position corresponding to the operation portion 442 and the inner guide 4430 reaches the position corresponding to the operation portion 442.

In such a case, the operation portion 442 is guided by the intermediate guide 4432 in the direction from the outer peripheral edge of the rotor 41 to the center of the rotor 41 (in the direction close to the center of the rotor 41); the second end of the rod portion 440 moves together with the operation portion 442 in the direction from the outer peripheral edge of the rotor 41 to the center of the rotor 41 (in the direction close to the center of the rotor 41); and the diaphragm plate 3 moves together with the first end of the rod portion 440 in the direction from the center of the rotor 41 to the outer peripheral edge of the rotor 41 (in the direction away from the center of the rotor 41). Moreover, the diaphragm plate 3 is changed from the aperture position to the retracted position.

The rotor 41 in this embodiment is provided with two aperture units, in each of which the diaphragm plate 3, the rod portion 440, the connection shaft 441, the operation portion 442, and the guide portion 443 are combined as one group.

In addition, the diaphragm plate 3, the rod portion 440, the connection shaft 441 and the operation portion 442 of one aperture unit on one side, and the diaphragm plate 3, the rod portion 440, the connection shaft 441 and the operation portion 442 of the aperture unit on the other side form a point-symmetrical configuration with the center of the rotor 41 as a reference. In addition, the inner guide 4430 of the guide portion 443 of the aperture unit on one side and the inner guide 4430 of the guide portion 443 of the aperture unit on the other side are formed continuously. However, the inner guide 4430 of the guide portion 443 of the aperture unit on one side and the inner guide 4430 of the guide portion 443 of the aperture unit on the other side may also be formed non-continuously.

In this embodiment, an initial position of the diaphragm plate 3 of each aperture unit is the retracted position. When the rotor 41 is rotated towards a first side of the optical axis circumferential direction (a counterclockwise direction of the optical axis circumferential direction in FIG. 2), a state is formed in which the diaphragm plate 3 of the aperture unit on one side is in the aperture position and the diaphragm plate 3 of the aperture unit on the other side is in the retracted position, as shown in FIG. 9.

Moreover, when the rotor 41 is rotated towards a second side of the optical axis circumferential direction (a clockwise direction of the optical axis circumferential direction in FIG. 2), a state is formed in which the diaphragm plate 3 of the aperture unit on one side is in the retracted position and the diaphragm plate 3 of the aperture unit on the other side is in the aperture position, as shown in FIG. 10.

The structure of the aperture device 2 of this embodiment is as described above. The action of the aperture device 2 will be elaborated below.

In an initial state of the aperture device 2 (a state in which no action is taken to change the amount of light incident on the lens 50), each diaphragm plate 3 is in the retracted position as shown in FIG. 3. Furthermore, in the aperture device 2 of this embodiment, actions of the aperture unit on one side and the aperture unit on the other side, which form the point-symmetrical configuration with the center of the rotor 41 as the reference, varies according to a rotation direction of the rotor 41.

Specifically, when the amount of light incident on the lens 50 is adjusted using the diaphragm plate 3 on one side, pulses are applied to the first regions 4200 of the piezoelectric element 420.

Figure 9A:
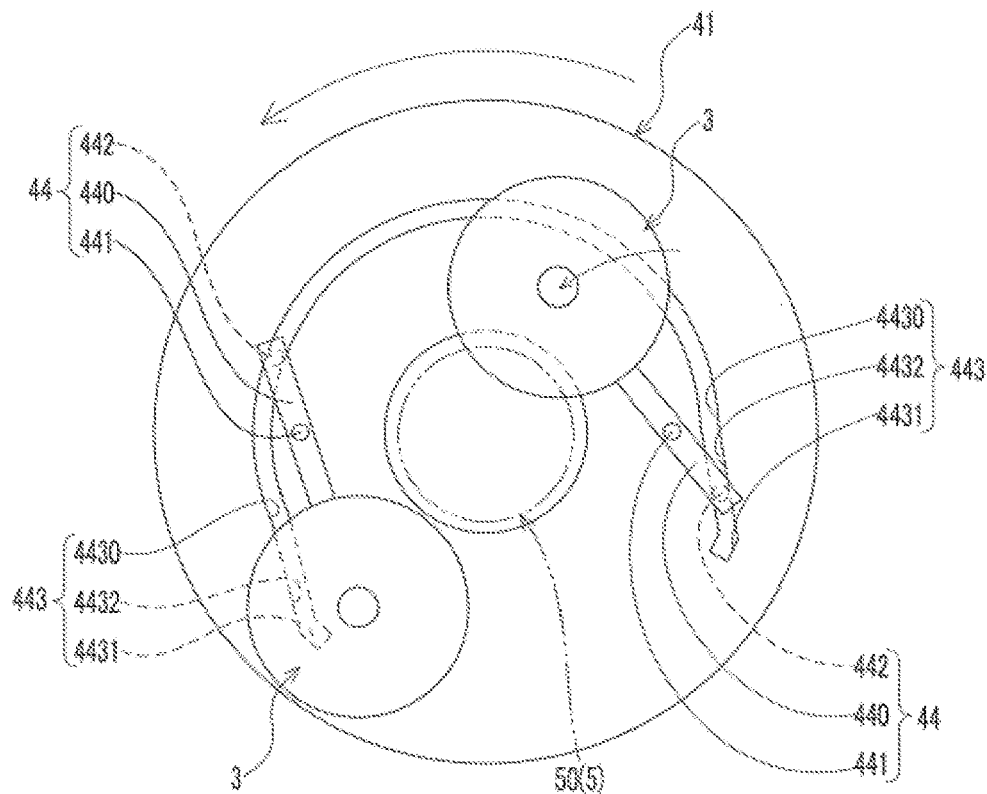
FIG. 9A is a schematic diagram illustrating an action of the aperture device of the same embodiment, representing a state in which a diaphragm plate on one side is moved midway from a retracted position to an aperture position.

In such a way, the abutting portion 421 pushes the rotor 41 to rotate to the first side of the optical axis circumferential direction (a counterclockwise direction in FIG. 9A). As a result, since the operation portion 442 moves towards the first side of the optical axis circumferential direction, a connection rod is rotated with the connection shaft 441 as the center and the diaphragm plate 3, which is fixed to a front end of the connection rod, moves towards the aperture position.

With the diaphragm plate 3 in the aperture position, only the light passing through the aperture opening 31 reaches the lens 50, and other light is obscured by the shielding region 30. The brightness of captured images and videos is suppressed.

Moreover, when the diaphragm plate 3 on one side returns to the retracted position, pulses are applied to the second regions 4201 of the piezoelectric element 420.

Figure 9B:
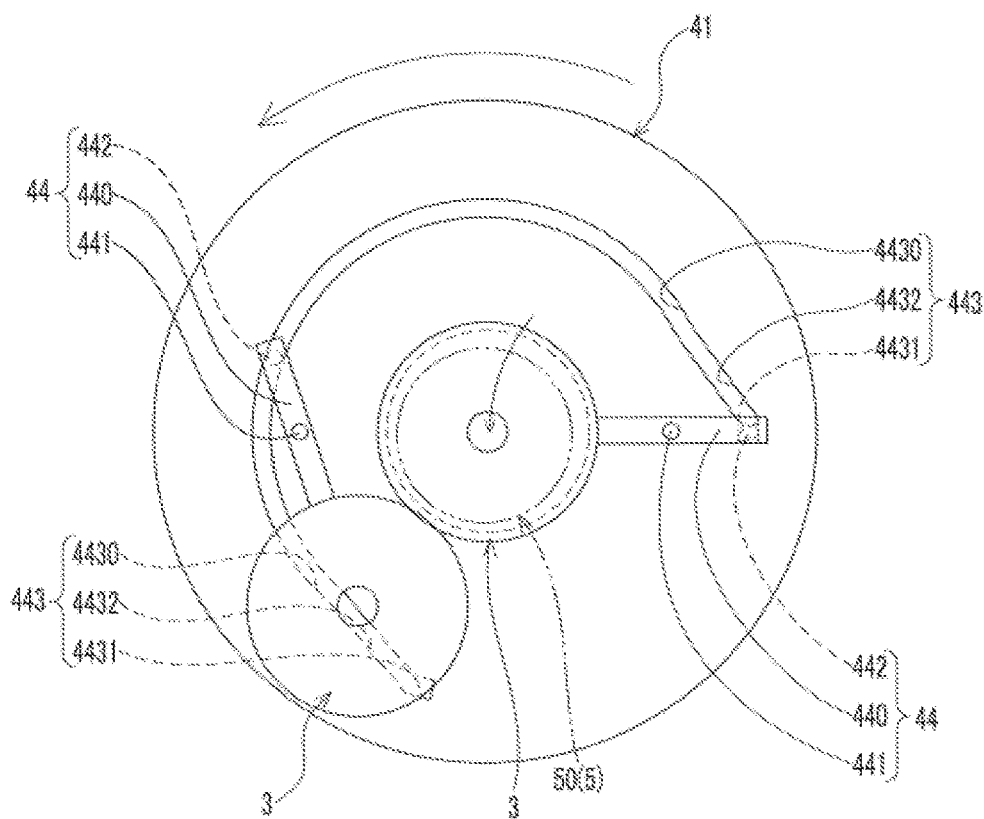
FIG. 9B is a schematic diagram illustrating an action of the aperture device of the same embodiment, representing a state in which the diaphragm plate on one side has been moved from the retracted position to the aperture position.

In this way, the abutting portion 421 pushes the rotor 41 to rotate to the second side of the optical axis circumferential direction (a clockwise direction in FIG. 9B). As a result, since the operation portion 442 moves towards the second side of the optical axis circumferential direction, the connection rod is rotated with the connection shaft 441 as the center and the diaphragm plate 3, which is fixed to the front end of the connection rod, moves from the aperture position to the retracted position.

With the diaphragm plate 3 on one side in the retracted position, space above the lens 50 is open.

Similarly, when the amount of light incident on the lens 50 is adjusted using the diaphragm plate 3 on the other side, pulses are applied to the second regions 4201 of the piezoelectric element 420.

Figure 10A:
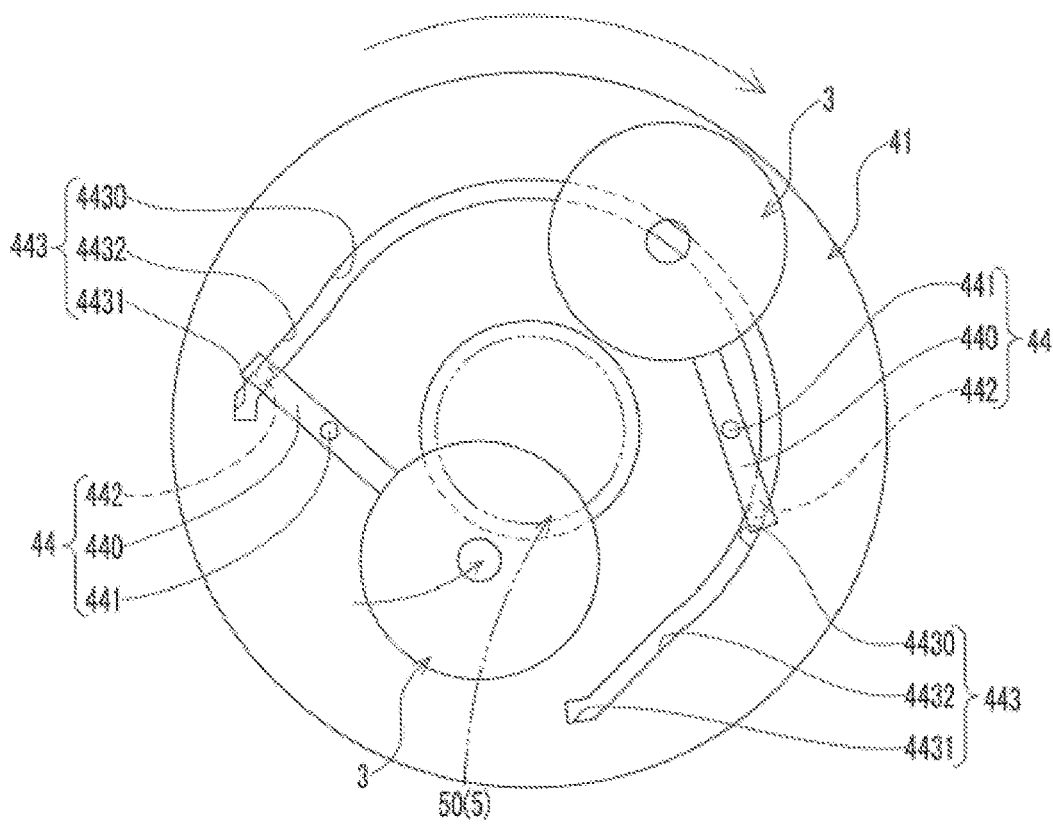
FIG. 10A is a schematic diagram illustrating an action of the aperture device of the same embodiment, representing a state in which a diaphragm plate on the other side is moved midway from a retracted position to an aperture position.

In this way, the abutting portion 421 pushes the rotor 41 to rotate to the second side of the optical axis circumferential direction (a clockwise direction in FIG. 10A). As a result, since the operation portion 442 moves to the second side of the optical axis circumferential direction, the connection rod is rotated with the connection shaft 441 as the center and the diaphragm plate 3, which is fixed to the front end of the connection rod, moves towards the aperture position.

With the diaphragm plate 3 on the other side in the aperture position, only the light passing through the aperture opening 31 reaches the lens 50, and other light is obscured by the shielding region 30. The brightness of captured images and videos is suppressed.

When the diaphragm plate 3 on the other side returns to the retracted position, pulses are applied to the first regions 4200 of the piezoelectric element 420.

Figure 10B:
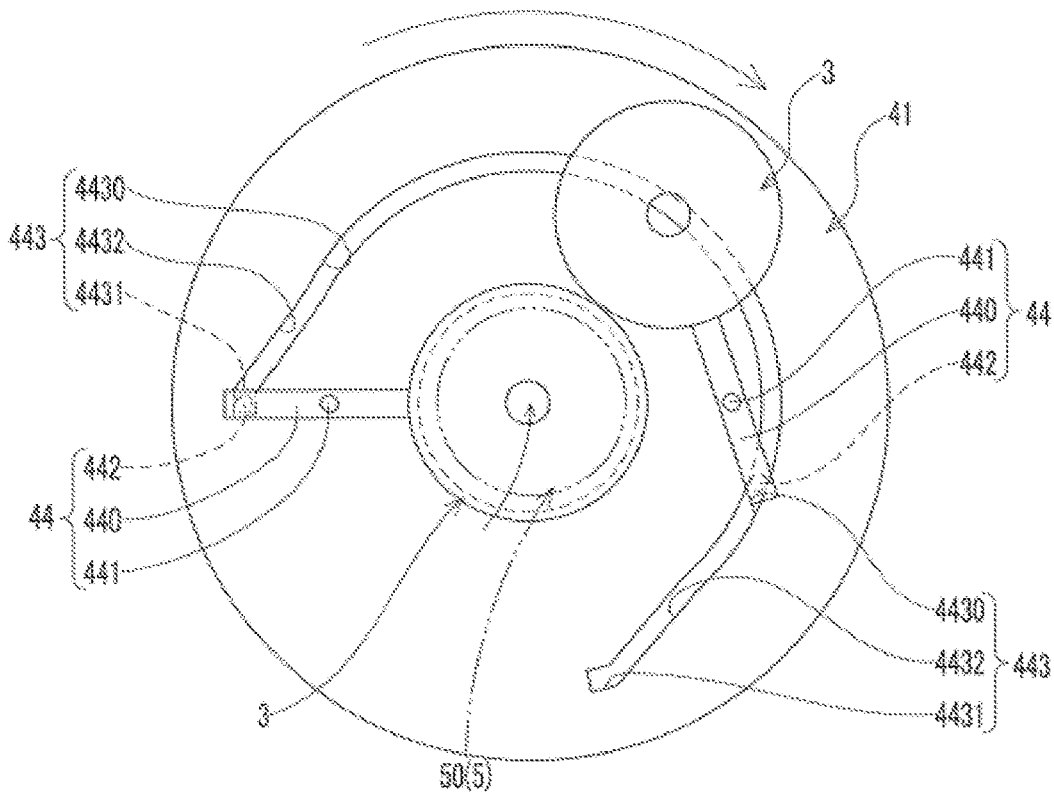
FIG. 10B is a schematic diagram illustrating an action of the aperture device of the same embodiment, representing a state in which the diaphragm plate on the other side has been moved from the retracted position to the aperture position.

In this way, the abutting portion 421 pushes the rotor 41 to rotate to the first side of the optical axis circumferential direction (a counterclockwise direction in FIG. 10B). As a result, since the operation portion 442 moves towards the first side of the optical axis circumferential direction, the connection rod is rotated with the connection shaft 441 as the center and the diaphragm plate 3, which is fixed to the front end of the connection rod, moves from the aperture position to the retracted position.

With the diaphragm plate 3 on the other side in the retracted position, space above the lens 50 is open.

In this way, the aperture device 2 of this embodiment can change the amount of light incident on the lens 50 using two kinds of diaphragm plates 3.

As described above, the aperture device 2 according to this embodiment is constituted in such a way that the amount of light incident on the lens 50 can be set by configuring the diaphragm plate 3 with a predetermined area of the aperture opening 31 in the aperture position (on the lens 50). Thus, when the diaphragm plate 3 is configured in the aperture position, a region through which the light incident on the lens 50 passes can always be set with a constant width, and the amount of light incident on the lens 50 can be set appropriately.

Thus, the aperture device 2 of this embodiment has an excellent effect of appropriately setting the amount of light incident on the lens 50.

Additionally, in the aperture device 2 of this embodiment, since the diameter of the aperture opening 31 formed in the diaphragm plate 3 on one side is different from the diameter of the aperture opening 31 formed in the diaphragm plate 3 on the other side, an aperture value (the amount of light incident on the lens 50) can be set appropriately stepwise.

In addition, the configuration-changing mechanism 4 is constituted to implement pushing and pressing operations on the cylindrical portion 411 of the rotor 41 by using the mounting portion 422, and the mounting portion 422 is constituted to trace an elliptical trajectory using the piezoelectric element 420 and to move. The opposite holding portions 430 for restricting the movement of the rotor 41 are in front of the mounting portion 422 (a direction in which the strongest force is applied to the cylindrical portion 411 of the rotor 41 from the mounting portion 422). The lateral holding portions 431 are in front of the mounting portion 422, and the lateral holding portions 431 apply force to the center of the rotor 41 while allowing the movement of the rotor 41, so that the movement of the rotor 41 is smoothed and the positional displacement is limited.

Furthermore, in the aperture device 2 of this embodiment, since the rotor 41 is provided with the diaphragm plate 3 and the moving mechanism for moving the diaphragm plate 3, the balance is difficult to disturb, and changes in postures of the aperture device with respect to the lens 50 can be limited.

Moreover, since the guide groove 443 on the rotor 41 functions to move the operation portion 442 mounted on the rod portion 440, the thickness of the aperture device as a whole can be limited.

The aperture device 2 of this embodiment includes two aperture units that are linked to the action of the same rotor 41. In other words, since one of the two aperture units is constituted in such a way that its motion is independent from that of the other aperture unit, it is possible to appropriately operate the two aperture units with high precision in accordance with the rotation of the rotor 41.

Moreover, since the diaphragm plate 3, the rod portion 440, the connection shaft 441 and the operation portion 442 of the aperture unit on one side, and the diaphragm plate 3, the rod portion 440, the connection shaft 441 and the operation portion 442 of the aperture unit on the other side form the point-symmetrical configuration with the center of the rotor 41 as the reference, the amount of rotation of the rotor 41 for moving the diaphragm plate 3 can be suppressed, enabling the diaphragm plate 3 to be moved efficiently.

Furthermore, the aperture device of the present disclosure is not limited to the above embodiments, and various changes can be made without departing from the principles of the present disclosure.

In the above embodiments, the diaphragm plate 3, the rod portion 440, the connection shaft 441 and the operation portion 442 of the aperture unit on one side, and the diaphragm plate 3, the rod portion 440, the connection shaft 441 and the operation portion 442 of the aperture unit on the other side form the point-symmetrical configuration with the center of the rotor 41 as the reference, but the structure is not limited thereto. For example, the diaphragm plate 3, the rod portion 440, the connection shaft 441 and the operation portion 442 of the aperture unit on one side, and the diaphragm plate 3, the rod portion 440, the connection shaft 441 and the operation portion 442 of the aperture unit on the other side may also form a line-symmetrical relationship with respect to an imaginary line that passes through the driving source (the piezoelectric element 420) and the optical axis of the lens 50 and that extends in the optical axis radial direction.

In the above embodiments, each of the two diaphragm plates 3 has the aperture opening 31, but the structure is not limited thereto. For example, one of the two diaphragm plates 3 has no aperture opening 31.

Since the diaphragm plate 3 with no aperture opening 31 is a shielding region 30 as a whole, the diaphragm plate 3 covers the entire lens 50 when configured in the aperture position. In this way, the diaphragm plate 3 with no aperture opening 31 is used to completely cut off a path of the light incident on the lens 50.

In the above embodiments, the connection shaft 441 is fixed to the cover 45, but the structure is not limited thereto. For example, the connection shaft 441 is fixed to the base 40, as long as the set position keeps unchanged during rotation of the rotor 41.

Figure 11:
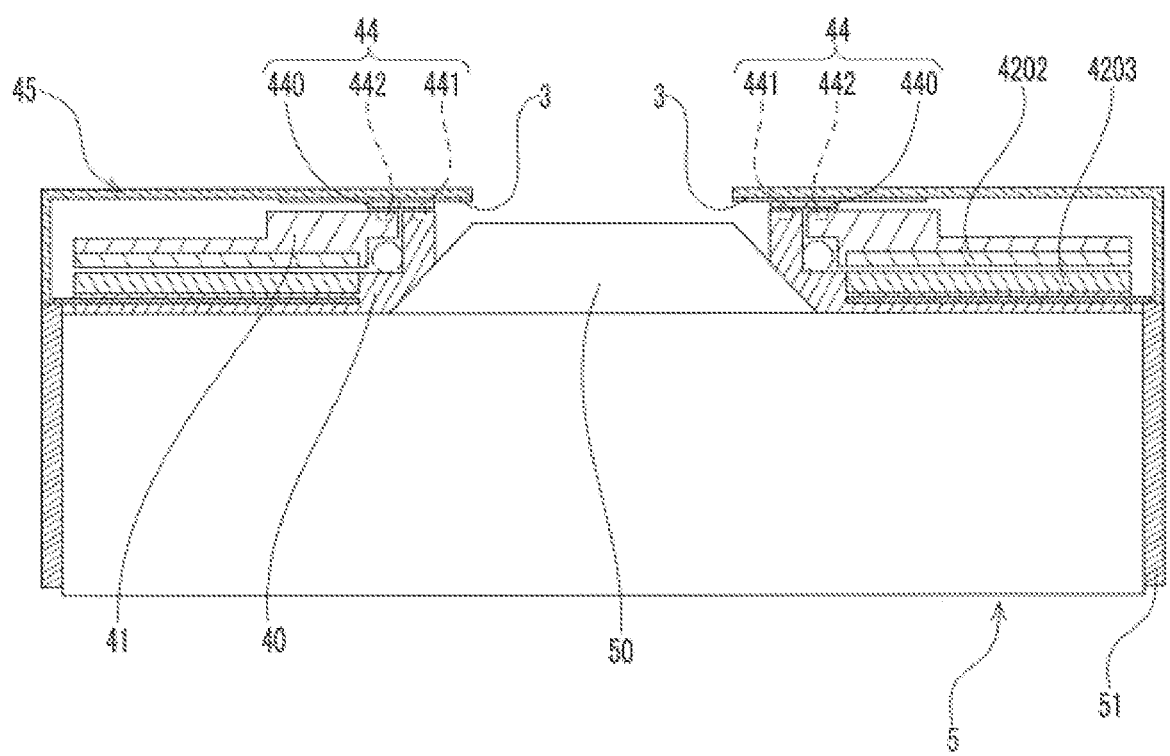
FIG. 11 is a schematic diagram showing an aperture device in accordance with another embodiment of the present disclosure.

The driving source 42 in the above embodiments includes the piezoelectric element 420, but the structure is not limited thereto. For example, as shown in FIG. 11, the driving source 42 also includes a motor consisting of a rotor 4202 and a stator 4203. In this way, it is easy to miniaturize the aperture device 2 by limiting the thickness of the driving source 42.

The invention claimed is:

1. An aperture device, comprising:
   a diaphragm plate comprising a shielding region for shielding light incident on a lens of a camera module; and
   a configuration-changing mechanism for changing a configuration of the diaphragm plate to an aperture position or a retracted position, wherein the aperture position is a position where the diaphragm plate is on the lens and a center of an aperture opening is located in a position corresponding to an optical axis of the lens, and the retracted position is a position where the diaphragm plate is retracted from the lens,
   wherein the configuration-changing mechanism comprises:
   a rotor rotatable in an optical axis circumferential direction with an optical axis as a center; and
   a moving mechanism moving the diaphragm plate to the aperture position or the retracted position according to rotation of the rotor,
   wherein the moving mechanism comprises:
     a rod portion extending outwards from an outer peripheral edge of the diaphragm plate;
     a connection shaft shaped as a shaft with a shaft center in line with an optical axis direction along which the optical axis extends, wherein the connection shaft is configured in a fixed state and rotatably coupled to the rod portion;
     an operation portion mounted closer to a front end than a position in the rod portion where the connection shaft is coupled;
     a guide portion causing the operation portion to move towards one side or another side of an optical axis radial direction orthogonal to the optical axis circumferential direction and the optical axis direction according to a rotation action of the rotor in the optical axis circumferential direction,
   wherein the configuration-changing mechanism comprises a holding structure fixing a configuration position of the rotor in a position where a center of the rotor coincides with a center of the lens,
   wherein the holding structure comprises:
   opposite holding portions in positions parallel to a driving source of the configuration-changing mechanism in the optical axis radial direction; and
   lateral holding portions in positions offset from the driving source in the optical axis circumferential direction, and
   wherein each of the opposite holding portions comprises:
     a first ball abutting the rotor from an outer side of the optical axis radial direction; and
     a bearing portion bearing the first ball on the outer side of the optical axis radial direction.

2. The aperture device according to claim 1, wherein the configuration-changing mechanism comprises the driving source driving the rotor to rotate in the optical axis circumferential direction.

3. The aperture device according to claim 1, comprising two aperture units, in each of which the diaphragm plate, the rod portion, the connection shaft, the operation portion, and the guide portion are formed as one group,
   wherein the aperture device is configured in such a way that in an open state where the diaphragm plate of one aperture unit on one side and the diaphragm plate of the other aperture unit on the other side are configured in the retracted position, the diaphragm plate of the one aperture unit on one side moves towards the aperture position in response to rotation of the rotor towards a first side of the optical axis circumferential direction, and the diaphragm plate of the other aperture unit on the other side moves towards the aperture position in response to rotation of the rotor towards a second side of the optical axis circumferential direction.

4. The aperture device according to claim 3, wherein the one aperture unit on one side and the other aperture unit on the other side form a point-symmetrical configuration with the center of the rotor as a reference.

5. The aperture device according to claim 3, wherein:
   a first aperture opening is formed in the diaphragm plate of one aperture unit on one side and penetrates the diaphragm plate in the optical axis direction; and
   a second aperture opening is formed in the diaphragm plate of the other aperture unit on the other side and comprises a diameter different from the first aperture opening, or the diaphragm plate of the other aperture unit on the other side is free of any aperture opening.

6. The aperture device according to claim 2, wherein the driving source comprises:
   a piezoelectric element on a lower side of an annular plate portion of the rotor and configured from an outer side towards an inner side in the optical axis radial direction;
   an abutting portion mounted on a front end of the piezoelectric element and abutting the rotor;
   a mounting portion mounting the piezoelectric element to a base of the configuration-changing mechanism; and
   a power supply portion supplying electric power transmitted to the piezoelectric element.

7. The aperture device according to claim 6, wherein:
the piezoelectric element comprises four regions arranged in two rows and two columns, wherein opposite first regions are homogeneous regions and opposite second regions are homogeneous regions;
each first region is elongated and each second region maintains its original shape, in response to applying pulses to the first regions; and
each second region is elongated and each first region maintains its original shape, in response to applying pulses to the second regions.

8. The aperture device according to claim 1, wherein each of the lateral holding portions comprises:
a second ball abutting the rotor from the outer side of the optical axis radial direction;
a tubular cylinder on an outer side of the second ball in the optical axis radial direction; and
a force-applying unit for abutment, wherein the force-applying unit is within the cylinder and applies force to the first and second balls and to the rotor.

9. A camera module, comprising:
a lens unit comprising a lens;
a housing accommodating the lens;
a power-receiving portion mounted on the housing and receiving electric power supply from outside; and
an aperture device for setting an amount of light incident on the lens,
wherein the aperture device comprises:
a diaphragm plate comprising a shielding region for shielding the light incident on the lens; and
a configuration-changing mechanism for changing a configuration of the diaphragm plate to an aperture position or a retracted position, wherein the aperture position is a position where the diaphragm plate is on the lens and a center of an aperture opening is located in a position corresponding to an optical axis of the lens, and the retracted position being a position where the diaphragm plate is retracted from the lens,
wherein the configuration-changing mechanism comprises:
a rotor rotatable in an optical axis circumferential direction with an optical axis as a center; and
a moving mechanism moving the diaphragm plate to the aperture position or the retracted position according to rotation of the rotor,
wherein the moving mechanism comprises:
a rod portion extending outwards from an outer peripheral edge of the diaphragm plate;
a connection shaft shaped as a shaft with a shaft center in line with an optical axis direction along which the optical axis extends, wherein the connection shaft is configured in a fixed state and rotatably coupled to the rod portion;
an operation portion mounted closer to a front end than a position in the rod portion where the connection shaft is coupled; and
a guide portion causing the operation portion to move towards one side or another side of an optical axis radial direction orthogonal to the optical axis circumferential direction and the optical axis direction according to a rotation action of the rotor in the optical axis circumferential direction,
wherein the configuration-changing mechanism comprises:
a base fixed to the housing;
a rotor on the base and rotatable in an optical axis circumferential direction;
a driving source rotating the rotor in the optical axis circumferential direction;
a holding structure fixing a configuration position of the rotor in a position where a center of the rotor coincides with a center of the lens;
a moving mechanism linked to rotation of the rotor and moving the diaphragm plate towards the aperture position or the retracted position; and
a cover covering the base, the rotor, the driving source, the holding structure and the moving mechanism; and
wherein the rotor comprises an annular plate portion and a cylindrical portion; the cylindrical portion protrudes downwards from a lower surface of a central part of the annular plate portion; and a front end portion of the lens is inserted in and passes through the cylindrical portion.

10. The camera module according to claim 9, wherein the driving source comprises:
a piezoelectric element on a lower side of the annular plate portion and configured from an outer side to an inner side in an optical axis radial direction;
an abutting portion mounted on a front end of the piezoelectric element and abutting the rotor;
a mounting portion mounting the piezoelectric element to the base; and
a power supply portion supplying electric power transmitted to the piezoelectric element.

11. The camera module according to claim 9, wherein the holding structure comprises:
opposite holding portions in positions parallel to the driving source in an optical axis radial direction; and
lateral holding portions in positions offset from the driving source in the optical axis circumferential direction.

12. An electronic apparatus, comprising:
a lens; and
an aperture device for setting an amount of light incident on the lens,
wherein the aperture device comprises:
a diaphragm plate comprising a shielding region for shielding the light incident on the lens; and
a configuration-changing mechanism for changing a configuration of the diaphragm plate to an aperture position or a retracted position, wherein the aperture position is a position where the diaphragm plate is on the lens and a center of an aperture opening is located in a position corresponding to an optical axis of the lens, and the retracted position is a position where the diaphragm plate is retracted from the lens,
wherein the configuration-changing mechanism comprises:
a rotor rotatable in an optical axis circumferential direction with an optical axis as a center; and
a moving mechanism moving the diaphragm plate to the aperture position or the retracted position according to rotation of the rotor,
wherein the moving mechanism comprises:
a rod portion extending outwards from an outer peripheral edge of the diaphragm plate;
a connection shaft shaped as a shaft with a shaft center in line with an optical axis direction along which the optical axis extends, wherein the connection shaft is configured in a fixed state and rotatably coupled to the rod portion;
an operation portion mounted closer to a front end than a position in the rod portion where the connection shaft is coupled; and
a guide portion causing the operation portion to move towards one side or another side of an optical axis radial direction orthogonal to the optical axis circumferential direction and the optical axis direction according to a rotation action of the rotor in the optical axis circumferential direction, wherein the configuration-changing mechanism comprises a holding structure fixing a configuration position of the rotor in a position where a center of the rotor coincides with a center of the lens, wherein the holding structure comprises:

opposite holding portions in positions parallel to a driving source of the configuration- changing mechanism in the optical axis radial direction; and lateral holding portions in positions offset from the driving source in the optical axis circumferential direction, and wherein each of the opposite holding portions comprises:

a first ball abutting the rotor from an outer side of the optical axis radial direction; and a bearing portion bearing the first ball on the outer side of the optical axis radial direction.

* * * * *